INVENTOR.
LLOYD A. BUCKMINSTER
BY WILLIAM A. WASHBURN
ATTORNEY

INVENTOR.
LLOYD A. BUCKMINSTER
BY WILLIAM A. WASHBURN

ATTORNEY

Feb. 21, 1967   L. A. BUCKMINSTER ETAL   3,304,586
APPARATUS FOR BLOCKING LENSES
Filed Jan. 20, 1964                     4 Sheets-Sheet 4
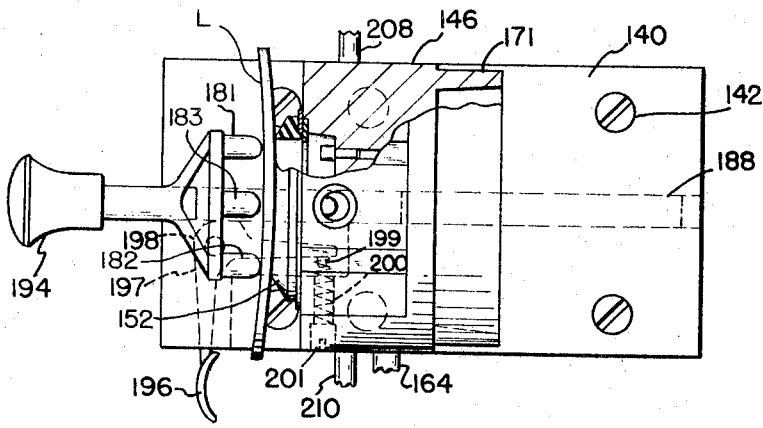
FIG. 4
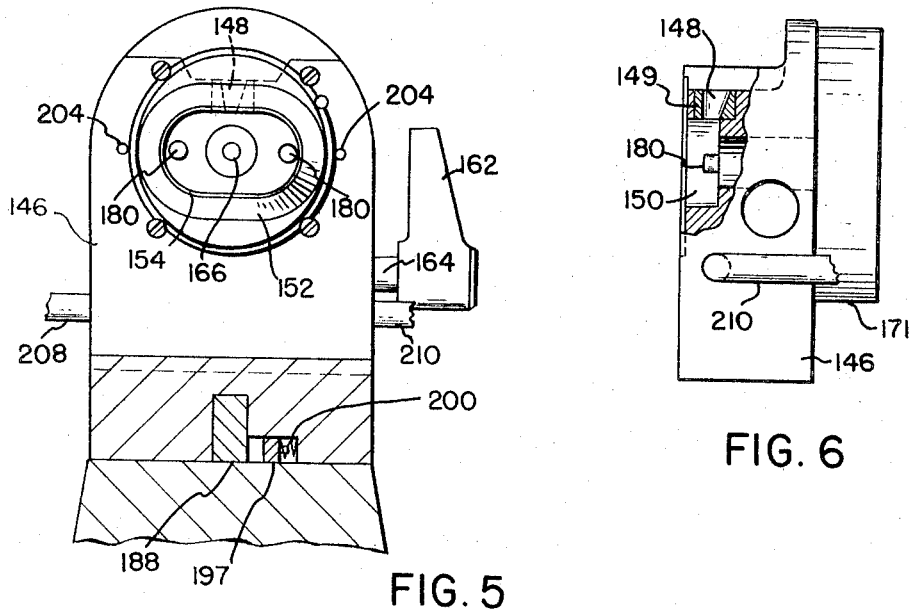
FIG. 5
FIG. 6
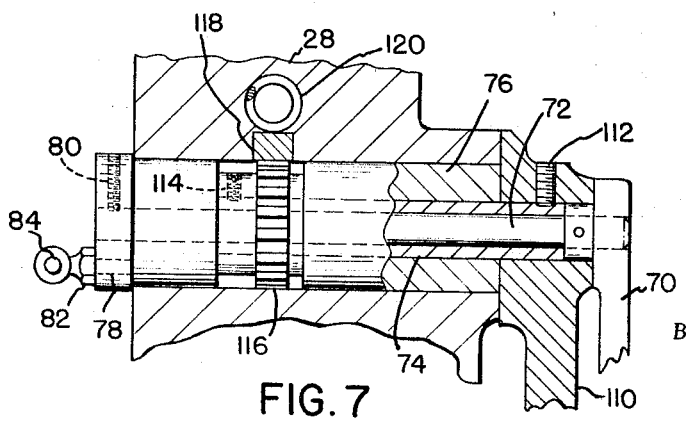
FIG. 7
INVENTOR.
LLOYD A. BUCKMINSTER
BY WILLIAM A. WASHBURN
ATTORNEY

United States Patent Office 3,304,586
Patented Feb. 21, 1967

3,304,586
APPARATUS FOR BLOCKING LENSES
Lloyd A. Buckminster, Geneva, and William A. Washburn, Phelps, N.Y., assignors to Textron Inc., Providence, R.I., a corporation of Rhode Island
Filed Jan. 20, 1964, Ser. No. 338,702
6 Claims. (Cl. 22—58)

The present invention relates to the blocking of lenses of spectacles for machining them, and more particularly to apparatus for blocking lenses so that they can be chucked in machines for finishing the lenses after surfacing.

It is conventional practice in manufacturing an ophthalmic lens to grind and polish the lens blank on each of its two sides, and then to grind it on its perimeter or edge.

The surface grinding or generating and polishing operations on one side are performed ordinarily in the factory which makes the lens; the second side surfacing and edge grinding operations are usually effected in the shop of a prescription optician on the appropriate machines. Ordinarily, for the edge grinding operation, it is customary to use a loading fixture for inserting the lens between two rubber chuck faces where it is clamped in position. One of the rubber faced chucks is first inserted in the loading fixture and the lens is lined up usually as to mechanical center and finishing axis by means of a hole in the center and axis marks on the sides of the loading fixture. The other rubber faced chuck is attached to the right hand spindle of the edge grinding machine. The loading fixture, bearing the lined up lens and chuck, is used to locate the chuck on two pins in the left hand spindle and the right hand spindle, which is in line with the left, is then brought up against the lens to cause it to be clamped in position. The loading fixture is then withdrawn.

Aside from the inaccuracies involved in lining up the lens in the loading fixture, where parallax is involved, there is a tendency for the lens to slip during the edge grinding operation while it is being held between the two rubber faced chucks. This is especially true if care is not taken to keep the rubber pads dry when lenses are clamped between them or if the pads are not replaced when they become worn. This tendency to slip is being further increased by today's prevalence of extreme lens shapes.

In U.S. Patent No. 3,049,766, granted August 21, 1962, there is disclosed apparatus for blocking lenses for both surfacing operations and edge grinding. With this apparatus a lens block may be cast on the lens, with which to hold the lens during generating and surfacing operations. Such a block is cast from a low-melting point alloy so that a block can easily be melted down after use, and recast into another block. Thus, an entirely new holding block can be provided for each lens.

The apparatus of Patent No. 3,049,766 can also be used for blocking a lens for an edge grinding operation as well as for generating and surfacing operations. Here a block suitable for holding the lens in an edge-grinding machine is first secured to the lens by pitch or other suitable adhesive, and then a block of low-melting point alloy for holding the lens during generating and surfacing is cast around the first block. After the generating and surfacing operations are completed, the alloy can be heated to melt it away from the first block (the melting point of the alloy is lower than the melting point of the first block and of the pitch or other adhesive) or it can be detached by mechanical means; and then the first block is left for use in holding the lens during edging. Again, however, there are the nasty jobs of applying pitch or adhesive to the lens or first block to secure the first block to the lens, and of cleaning the pitch or adheisve off the lens and first block when the edge-grinding operation is completed.

In edging a lens it is customary to center the lens on what is called its mechanical center, in order to grind it in conformity with the interpupillary distance called for on the lens prescription for the two lenses of a pair. The practice is to measure the blank, then to mark it so that it can be properly positioned in the edging machine for the finishing or edging operation, then to effect the edging. If it becomes necessary to regrind the edge of a lens for reducing the size of the lens to fit a particular spectacle frame, the lens must be re-aligned in the loading fixture and returned to the edging machine. This sometimes militates against accuracy.

One object of the present invention is to provide apparatus for blocking a lens for an edge-grinding operation with which the block can be adhered to the lens without use of pitch or of an adhesive that requires a tedious operation to remove.

Another object of the present invention is to provide apparatus for blocking lenses, which will insure that even for edge grinding, a new block will be provided for each lens that has to be blocked.

Another object of the invention is to provide apparatus of the character described which will permit a lens to be blocked for an edge-grinding operation more accurately than previous apparatus.

Another object of the invention is to provide apparatus for blocking a lens which will enable a lens to be taken out of the machine and put back precisely for reducing the size of the lens should this be desirable, without having to attempt to line up the lens.

Another object of the invention is to provide a lens blocker for use in edge grinding which will fix a block to a lens so that there is no danger of slippage between the lens and the block.

Another object of the invention is to provide a lens blocker which is suitable for use by a prescription optician or optometrist for blocking lenses for edge-grinding.

Another object of the invention is to provide a lens blocker which is suitable for use by a prescription optician or optometrist to block lenses for grinding them on conventional edge grinders without at the same time requiring that blocks previously be provided for holding the lenses during surfacing of the lenses.

Other objects of the invention will be apparent hereinafter from the specification and from the recital of the appended claims particularly when considered in conjunction with the accompanying drawings.

In the drawings:

FIG. 4 is a plan view, partly broken away, showing the mold block and lens holder with a lens mounted therein for molding a lens block to the lens;

FIG. 5 is a front elevation of the mold block;

FIG. 6 is a side elevation of the mold block, partly broken away; and

FIG. 7 is a fragmentary sectional view on the line 7—7 of FIG. 1 but on an enlarged scale.

Figure 1:
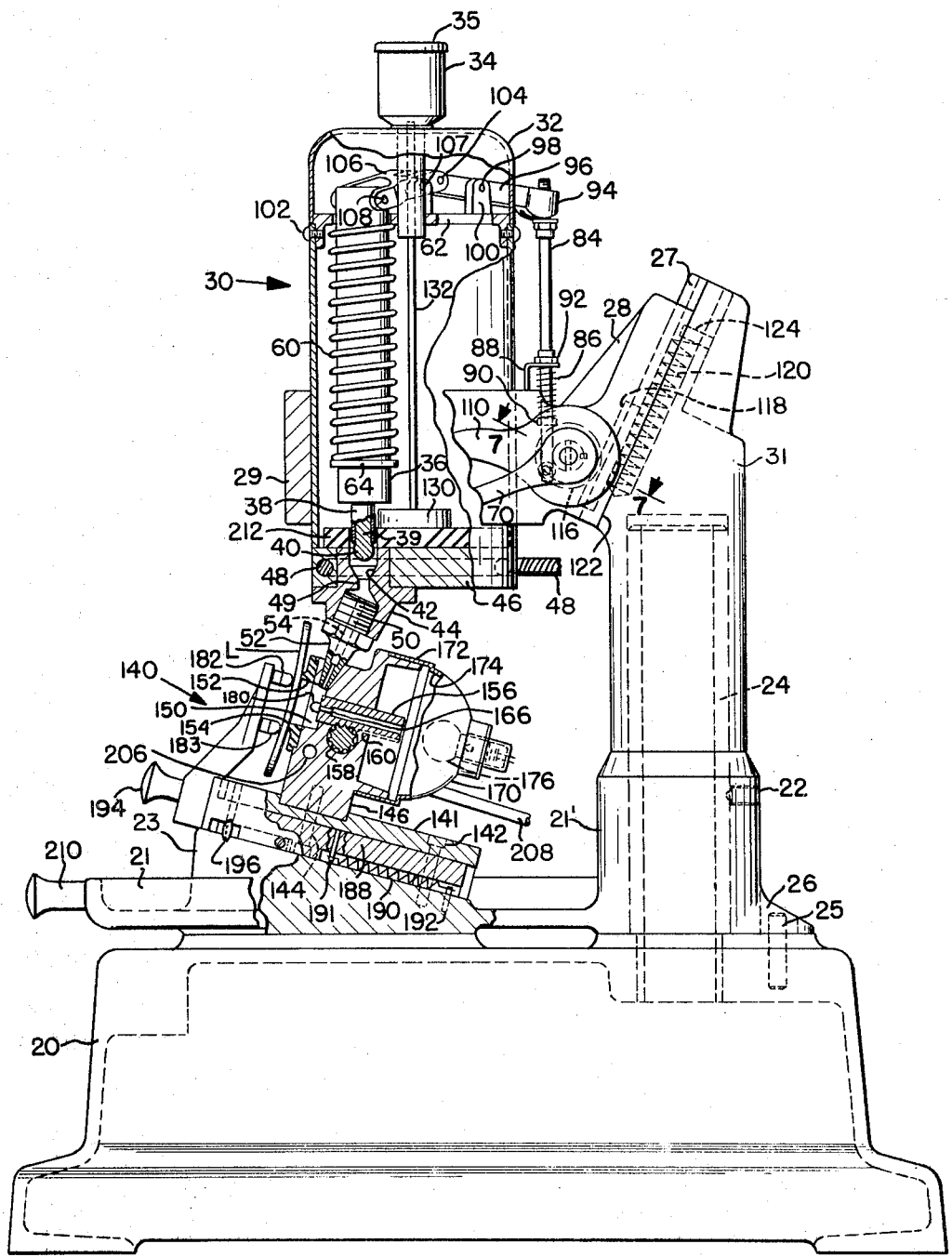
FIG. 1 is a side elevation, partly broken away, of a lens blocking machine constructed according to one embodiment of this invention.

In the embodiment of the invention illustrated in the drawings, a pot is provided which will hold a supply of molten metal sufficient to mold a number of lens blocks on lenses whose edges are to be ground. Mounted in the pot is a reciprocable valve which is constantly urged to its seat by a spring, to shut off flow from the pot of the molten metal, which is a low-melting point alloy. A nozzle is secured beneath the pot; and when the valve is lifted off its seat the metal can flow from the pot into the nozzle.

The pot is carried on a slide which is slidably adjustable on a column that is fixed to a trunnion post which is fixedly secured in the base of the apparatus. Mounted on the post for rotary adjustment thereon beneath the nozzle is a turret on which there are mounted two identical molding assemblies. The turret can be swung in one direction or the other about the post to bring one or the other molding assembly selectively under the nozzle.

Each molding assembly comprises a lens holder and a mold block. Each mold block has a cavity shaped to the desired size and shape of the lens block which it is desired to mold on and adhere to a lens for holding the lens while it is being edge ground. There is an opening in the mold block into which the nozzle can be inserted upon lowering of the slide on which the pot is carried. When the valve is opened, then, molten metal will flow from the pot into the mold cavity. The lens, on which the block is to be molded, is held against the front of this cavity to close the same by fingers that are spring-pressed into lens-holding position. After the mold cavity is filled with molten metal, the metal is cooled, to adhere it to the lens, by cooling water circulated through the mold block. After the block thus formed in the mold cavity has been cooled, the lens holder is released to remove from the molding assembly the lens and the lens block which has been formed and adhered to the lens. The turret permits of bringing the two molding assemblies alternatively into registry with the pouring nozzle to permit molding a lens block on a lens carried by one molding assembly while removing together from the other assembly as a unit a lens and a lens block previously molded thereon.

Figure 2:
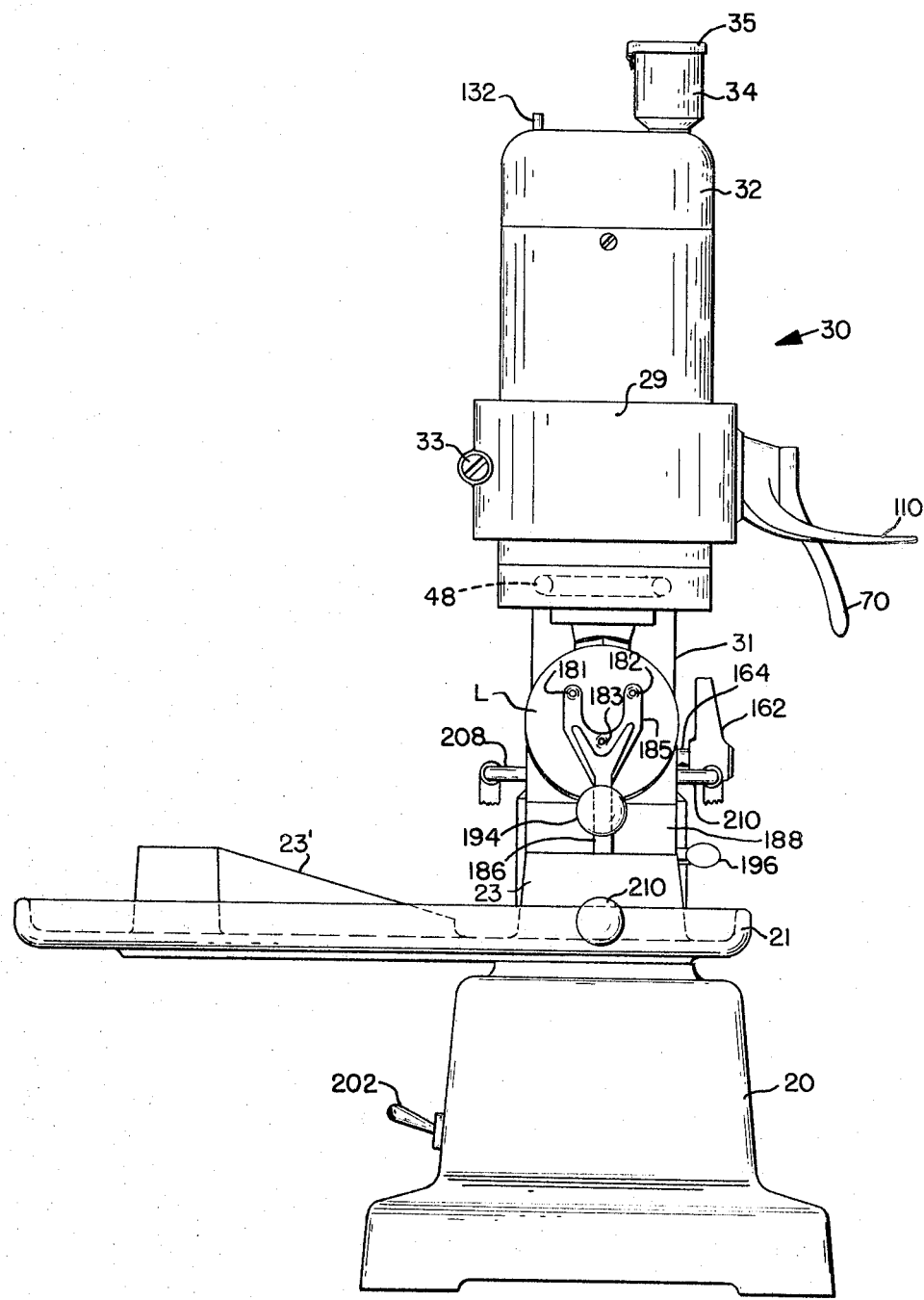
FIG. 2 is a front elevation of this machine.
Figure 3:
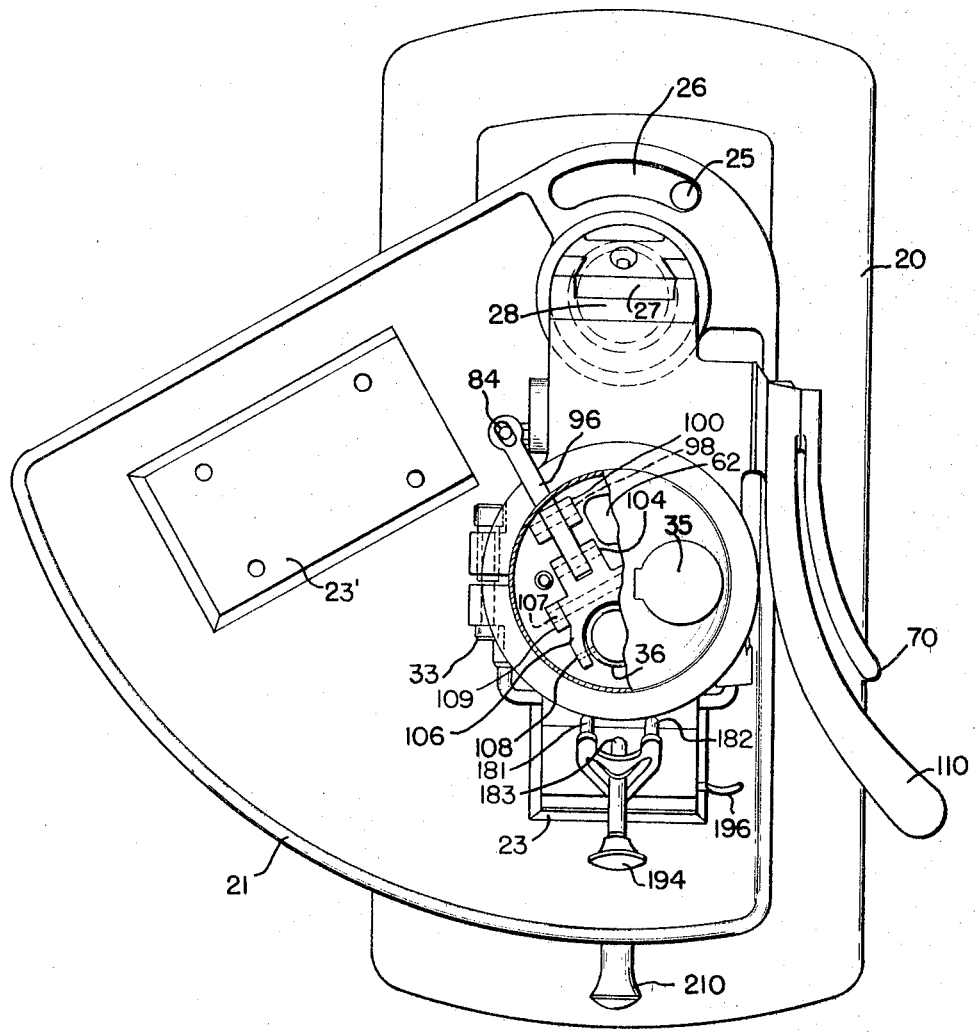
FIG. 3 is a plan view of this machine, parts being broken away.

Referring now to the drawings by numerals of reference, and first to FIGS. 1 to 3 inclusive, 20 denotes the base of a lens blocker. Pivotally mounted on this base is a turret 21 to the upper face of which there are secured, or with which there are formed integral, two pads 23, 23′ (FIGS. 2 and 3) that are spaced angularly from one another about the pivotal axis of the turret. The turret is pivotally adjustable about a vertically-disposed hollow trunnion post 24 which is secured to the base 20. The pivotal movement of the turret in either direction is limited by the dowel pin 25, which engages in an arcuate slot 26 that is coaxial with post 24. A conventional spring-pressed ball detent 22 mounted in the journal portion 21′ of the turret releasably engages one or the other of two angularly-spaced notches in the periphery of the post to releasably hold the turret at either limit of its angular movement.

Mounted on the post 24 above the journal portion 21′ of the turret is a column 31. The column 31 has an inclined upper face formed with a dove-tailed guide portion 27 on which there is slidably mounted a slide 28, which is formed at its lower end with a laterally-projecting split-clamp collar portion 29 that is closed by screw 33 (FIGS. 2 and 3).

Mounted in the collar portion 29 is a cylindrical melting pot 30 which is closed at its upper end by an inverted cup-shaped cap 32 in which there is mounted a funnel 34 through which there may be poured the melted low-melting point alloy from which the lens blocks are to be made. Funnel 34 is closed at its top by a cover 35 which is hingedly connected to the funnel.

Mounted in the pot 30 to reciprocate vertically therein is a hollow, cylindrical plunger 36 (FIG. 1) in the bottom of which there is secured a sleeve 38 in which there is fastened a stem 39 having a ball head valve portion 40 at its lower end. The valve is adapted to seat on a conical seat 42 formed in a flanged valve block 44 that is fastened by screws through its flange, or otherwise, to a plate 46 which is welded or otherwise secured to the bottom of the pot 30 to close the bottom end thereof.

The plate 46 holds the electric heater cables 48 which serve to keep the alloy in the pot 30 in hot, melted condition.

Below the valve seat 42, the block 44 is formed with a narrowed duct portion 49 which communicates with the bore of a flanged nozzle 50 that threads into the block 44. The protruding nose portion 52 of the nozzle is of inverted conical shape; and the nozzle has a duct 54 through it through which the alloy can flow, when valve portion 40 is off its seat, to the cavity of the mold.

A coil spring 60, which surrounds the plunger 36 and which is interposed between a plate 62 and a ring washer 64, serves normally to urge the valve 40 onto its seat. The plunger 36 is hollow to receive a conventional thermostat which switches the circuit to the heater cable 48 on and off.

The valve portion 40 is adapted to be moved on and off its seat by a lever 70, which is keyed to a shaft 72 (FIG. 7) that is journaled in the sleeve 74, which in turn is mounted in a sleeve 76 secured in the slie 28. Fastened by means of a setscrew 80 to the end of the shaft 72 opposite from that to which the lever 70 is fastened, is a disc 78. Secured to this disc 78 in offset relation to the shaft 72 is a stud 82 to which there is secured a rod 84 (FIGS. 1 and 3).

The rod 84 is normally pressed downwardly by a coil spring 86 which is interposed between an angle bracket 88, that is fastened to the sleeve 29, and a collar 90, that is secured to the rod 84. A stop nut 92 serves to limit the downward movement of the rod 84.

The upper end of the rod 84 is threaded; and straddling the threaded portion of the rod is the furcated outer end 94 of a lever 96, which is pivoted intermediate its ends on a pin 98. The pin 98 is carried by the ears 100 which are formed integral with the plate 62. The plate 62 is secured in the inside of the pot 30 by screws 102. The lever 96 is pivoted at its inner end by means of a pin 104 to one end of an H-shaped lever 106, whose opposite end is pivoted by means of pins 108 to the plunger 36. This lever 106 is pivoted intermediate its ends by a pin 107 on ears 109 that are integral with plate or web 62.

The nozzle 50 is moved to and from operative engagement with the mold by a lever 110 (FIGS. 1, 2, 3 and 7), which is secured by a setscrew 112 (FIG. 7) to the sleeve 74. Fastened to this sleeve, also, by a setscrew 114 is a spur pinion 116 which meshes with the teeth of a rack 118 that is secured to the column 22 between the sides of the dove-tailed guide portion 27. A coil spring 120, which seats at its lower end against the projection 122 of the slide 28 and which is fastened at its upper end to a pin 124, that is secured in the column 31, serves to urge the slide 28 constantly downwardly.

A float 130, which is secured to the lower end of the float rod 132, and which extends upwardly through the funnel 34 shows the level of the molten metal in the pot 30, and indicates when the pot should be refilled.

Mounted on the inclined upper faces of each of the base pads 23, 23′ are molding assemblies 140. For the purposes of clarity and to avoid needless drawings, the molding assembly which seats on top of pad 23′, has been omitted from the drawings. It is identical in structure, however, to the molding assembly 140 shown, which is carried on pad 23. The molding assembly 140 comprises a base portion 141 which is secured to the pad 23 by screws 142 (FIG. 1). Secured to the base portion 141 by screws 144 is a mold block 146.

The mold block has an opening 148 (FIG. 6) in it to receive the nose 52 (FIG. 1) of the nozzle 50, and communicating with the opening 148 is the mold cavity 150 which is shaped in accordance with the desired shape of the lens block that is to be formed.

Seated against the front face of the mold block is a molded neoprene rubber seal ring 152 of oval shape (FIGS. 4 and 5), whose bore registers with the mold cavity. This seal ring has a raised ridge portion 154

(FIGS. 1 and 5) formed on it, against which the lens L, to which the lens block is to be fastened, seats.

Mounted in the mold block to reciprocate therein in axial alignment with the mold cavity is a plunger-ejector 156 (FIG. 1) which is adapted to be moved in and out by a pinion 158 that meshes with a rack 160 formed on the periphery of the plunger. The pinion is adapted to be rotated by a lever 162 (FIG. 2) which is keyed to one end of a shaft 164, that is rotatably journaled in the mold block, and to the other end of which the pinion 158 is secured. Movement of the lever 162 moves the plunger 156 in and out in the mold block. When the plunger is moved forward it will strip a molded lens block from the mold cavity.

Mounted coaxially within the plunger 156 is a pin or rod 166 (FIG. 1), which is made of clear nylon or any plastic material. This pin at its forward end extends into the mold cavity, and also serves to contact the lens during the lineup operation to avoid parallax and to eject the lens block after it is molded.

Secured on the rear of the mold block is a dome-shaped member 170 which has a resilient ring portion 172 at its forward end that snaps around the annular rear portion 171 (FIG. 4) of the mold block. The dome-shaped part 170 has a polished reflecting surface 174 on its inside, and mounted centrally within the dome portion is a light bulb 176. This light bulb, when lighted, sends a shaft of light through the nylon pin 166 to assist in lining up the lens with reference to the block to be cast thereon, as will be described further hereinafter.

Mounted in the mold block at opposite sides of the pin 166 are two pins 180 (FIG. 5), which protrude into the mold cavity and which serve to impress holes in the cast lens block that are adapted to fit over pins on the spindle of a lens edge grinder to properly center the lens block and the lens carried thereby on the spindle of the grinder.

The lens L, which is to be blocked, is held against the seal ring 152 by three pins 181, 182, and 183 (FIGS. 1, 2 and 4). The pins 181 and 182 are carried by the furcations of a lens holder 185; and the pin 183 is secured in this lens holder below but midway between the pins 181 and 182. The lens holder is of generally Y-shaped and has a leg portion 186 (FIG. 2) integral with a slide 188 (FIG. 1) that is adapted to slide in the base portion 141. A coil spring 190, which is secured at one end to the pin 191 that has a pressed fit in the slide 188, and which is secured at its other end to a pin 192 that has a pressed fit in the pad 23, serves constantly to urge the lens holder to retracted position shown in FIG. 1. This is the position in which the pins 181, 182 and 183 press against the front face of the lens L to hold it seated with its back face against the seal ring 152. A knob 194 can be grasped to pull the lens holder outwardly against the resistance of the spring 190 to pull the pins 181, 182 and 183 far enough away from the lens to permit insertion of a lens L between the pins 181, 182 and 183 and the seal ring 152, and to permit removal of the lens with a block molded thereon from the apparatus.

A bell-crank lever 196 (FIG. 2, 3 and 4) is provided to lock the lens holder in its outward disengaged position. This lever is pivoted by means of a pin 197 in the block 140. The lever 196 is constantly urged counter-clockwise about its pivot, as seen in FIG. 4, by a coil spring 200 (FIGS. 4 and 5), which engages at one end over a pin 199 formed adjacent the inner end of the lever, and which seats at its other end against an adjusting screw 201 threaded into the block 140. The lever has a cam portion 198 intermediate its ends. The pressure of the spring 200 holds the cam portion of the lever against the side of the slide 188 to hold the lens holder 185 in any position to which it is pulled by the knob 194. After the lens L has been withdrawn from between the pins 181, 182, and 183 and the seal 152, upon rocking the lever 196 clockwise, the spring 190 will retract the lens holder immediately to its rear position.

As stated, the turret 21 is adapted to support two molding assemblies 140 although only one is shown in FIG. 3. This permits swing of the turret about the axis of the post 24 to move one molding assembly 140 under the nozzle 50 to mold a lens block onto one lens while an already blocked lens is being removed from the other assembly.

In the use of the apparatus illustrated, melted alloy is poured through funnel 34 (FIG. 1) into pot 30 to the desired depth, measurable by float 130; and the switch which supplies current to the heating cables 48 is tripped to cause these cables to keep the pot warm enough to maintain the alloy in liquid condition.

Before chucking a lens on the apparatus, to mold a chucking block thereon, the mechanical center of the lens is marked in the usual manner. The mechanical center of the lens can then readily be lined up with the mold cavity by tripping the switch arm 202 (FIG. 2) to illuminate the light 176 (FIG. 1). This sends a ray of light through the nylon rod 166, and through two holes 204 (FIG. 5) in the lens block, which also communicate with the space enclosed by dome-shaped reflector 170. The light passing through these three holes enables the operator to align the markings on the lens with the light beams, that is, to locate the lens properly on the molding assembly so that the block will be molded on the lens in the proper position for holding the lens on the edge so as to grind the desired edge on the lens.

To avoid parallax, the lever 162 (FIG. 2) is actuated to move the head of the rod 166 into actual contact with the lens during this aligning process. This insures complete accuracy in lining up the lens. The light shining through the lens from the rod 166 and through the two holes 204 enables the lens to be lined up accurately. The centers of the lens rod and of the two holes are on the same straight line which is here horizontal. No nylon rods are required for the outside light holes 204 because they are outside of the mold cavity.

After the lens has been lined up properly with the lens cavity, the lever 162 (FIGS. 2 and 5) is rocked to withdraw the plunger 156 and rod 166 from engagement with the lens. The lens L is now held in proper position by pins 181, 182 and 183 for molding a lens block in proper position thereon. Then the lever 110 (FIGS. 1, 2 and 7) is rocked in the direction to bring the nozzle 50 down into its seat 148 (FIG. 6) in the mold block. Then the lever 70 is rocked to cause the valve 40 (FIG. 1) to be lifted off its seat 42 allowing the molten metal to flow from the pot 30 through the nozzle 50 into the cavity 150 of the mold block.

After the mold cavity is filled with the molten metal, the operator will return the valve 40 to is seat by moving the lever 70; and then he will disengage the nozzle 50 from the mold block by moving the lever 110. Then by grapsing the knob 210, the turret 21 can be rotated to bring the other mold block under the nozzle so that a lens block can be molded for the lens carried thereby while the first lens and the block that has been molded and adhered thereto are being removed from the apparatus, and a new lens is being chucked in position ready for molding a lens block thereto.

Ducts 206 are provided in the mold block which are connected with water inlet and outlet pipes 208 and 210, respectively, through which water can be flowed to cool the molten metal in the mold cavity 150 rapidly to harden the lens block and adhere it to the lens.

After a lens block has been hardened and thereby adhered to its lens, the knob 194 is grasped and the lens holder 186 is pulled outwardly to disengage the pins 181, 182 and 183 from the lens. The coil spring 198 (FIG. 4) serves to hold the cam portion 198 of the lever arm 197 against the side of the slide 188 to frictionally hold the lens holder in dechucked position. The operator, therefore, has plenty of room to lift the lens out from between the pins 181, 182, 183 and the seal 152. The rod 156 (FIG. 1) can be operated by lever 162 (FIG. 5) to free and eject the hardened lens block, with the lens attached thereto, from the mold cavity.

The pins 180 impress holes in the cast lens block, which fit over the pins in the spindle of the edger to hold the lens block, and the lens that is adhered thereto, securely during grinding. These holes are cast in the lens block so that it is unnecessary to line up a lens in the edger. With lens blocks cast on this machine, lenses can be taken out of the edger, tested for size, and put back again, precisely, if necessary, in order to grind more off the lens if it is desired to reduce the size of the lens.

Standard cartridge heaters are sufficient to keep the metal molten in the pot 30.

The tank or pot 30 is preferably made large enough to hold sufficient metal for a large number of lens blocks. In one embodiment of the invention the pot will hold enough metal for seventy lens blocks.

When the metal in the tank is in the process of being melted there may be an expansion pressure built up in the bottom of the tank before the top surface of the metal has melted sufficiently to allow it to be relieved. Therefore a silicone sponge rubber pad 212 (FIG. 1) approximately half an inch in thickness is put on top of the block 46 so that expansion inside the pot compresses the rubber instead of blowing the molten metal by the seal and out through the nozzle.

While the invention has been described in connection with a specific embodiment thereof, it will be undersood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention of the limits of the appended claims.

Having thus described our invention, what we claim is:

1. Apparatus for molding on a lens blank a lens block for holding the blank in a lens-edging machine, said apparatus comprising
    (a) a mold block having therein a cavity open at one side,
    (b) means for clamping a lens blank against said open side so that said lens blank covers and closes said cavity,
    (c) means including a light source mounted on said mold block behind said cavity for directing a plurality of beams of light from said light source through said mold block onto said lens blank to enable the lens blank to be properly positioned on the mold block, and
    (d) means for supplying molten metal to said cavity to mold the lens block and adhere it to the lens blank,
    (e) said mold block having therethrough a plurality of spaced holes through which said beams of light are directed onto said blank, at least one of said holes opening on said cavity, and at least two other of said holes opening on the front side of said mold block externally of said cavity.

2. Apparatus for molding on a lens blank a lens block for holding the blank in a lens-edging machine, said apparatus comprising
    (a) a mold block having therein a cavity open at one side,
    (b) means for clamping a lens blank against said open side so that said lens blank covers and closes said cavity,
    (c) means for directing a plurality of beams of light through said mold block onto said lens blank to enable the lens blank to be properly positioned on the mold block,
    (d) and means for supplying molten metal to said cavity to mold the lens block and adhere it to the lens blank,
    (e) said light directing means comprising a transparent plastic rod, and
    (f) means for moving said rod through said cavity into and out of contact with the lens blank.

3. Apparatus for molding on a lens blank a block for holding the blank for a machining operation thereon, said apparatus comprising
    (a) a mold block having therein a cavity open at one side,
    (b) means for clamping a lens blank against said one side so that said lens blank covers and closes said cavity,
    (c) means for supplying molten metal to said cavity to mold the lens block and adhere it to the lens blank,
    (d) an ejector reciprocably mounted in said mold block,
    (e) means for moving said ejector forwardly in said mold block to strip the lens block from the mold,
    (f) a transparent plastic rod carried by said ejector, and
    (g) a light source for illuminating said rod to provide a point of light for enabling the blank to be located relative to said cavity, said mold block having two apertures therein at opposite sides, respectively, of said transparent plastic rod, said apertures being in communication with said light source to provide two further points of light for aligning the lens blank properly with respect to said cavity.

4. Apparatus as claimed in claim 3, wherein
    (a) two pins are mounted in said mold block at opposite sides, respectively, of said transparent plastic rod, and
    (b) each pin is mounted between said plastic rod and one of said apertures to form in the lens block two recesses by which the lens block can be located on a machine for the machining operation.

5. Apparatus as claimed in claim 3, wherein the centers of said two apertures and of the plastic rod are in a straight line.

6. Apparatus as claimed in claim 5, wherein the centers of the two apertures, of the plastic rod, and of the two pins are in a straight line.

References Cited by the Examiner

UNITED STATES PATENTS

| 3,049,766 | 8/1962 | Buckminster | 22—202 XR |
| 3,118,198 | 1/1964 | Prunier | 22—202 |
| 3,195,197 | 7/1965 | Prunier | 22—58 |
| 3,221,378 | 12/1965 | Faas et al. | 22—202 XR |

FOREIGN PATENTS 1,020,149   2/1966   Great Britain.

J. SPENCER OVERHOLSER, *Primary Examiner.*

V. K. RISING, *Assistant Examiner.*